(12) United States Patent
Masterson et al.

(10) Patent No.: US 10,474,428 B2
(45) Date of Patent: Nov. 12, 2019

(54) SORTING PARSED ATTACHMENTS FROM COMMUNICATIONS

(71) Applicant: MICROSOFT TECHNOLOGY LICENSING, LLC, Redmond, WA (US)

(72) Inventors: Joey Masterson, Bellevue, WA (US); Russell Lee Simpson, Jr., Redmond, WA (US); Ilya Smirnov, Redmond, WA (US); Paul Limont, Redmond, WA (US); Kip Fern, Redmond, WA (US); Jason Cook, Redmond, WA (US); Elena Catrinescu, Woodinville, WA (US); Hayley Steplyk, Cambridge, MA (US); David Meyers, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 553 days.

(21) Appl. No.: 14/873,220

(22) Filed: Oct. 2, 2015

(65) Prior Publication Data

US 2017/0097808 A1 Apr. 6, 2017

(51) Int. Cl.
*G06F 3/0484* (2013.01)
*G06F 7/08* (2006.01)
(Continued)

(52) U.S. Cl.
CPC .............. *G06F 7/08* (2013.01); *G06F 3/0482* (2013.01); *G06F 3/04842* (2013.01);
(Continued)

(58) Field of Classification Search
CPC ..... G06F 3/0484; G06F 17/24; G06F 17/2205
See application file for complete search history.

(56) References Cited

U.S. PATENT DOCUMENTS 7,243,298 B2 7/2007 Yozell-Epstein et al.
7,831,676 B1 11/2010 Nagar
(Continued)

FOREIGN PATENT DOCUMENTS

EP 1182600 A2 2/2002
EP 2497018 A1 9/2012

OTHER PUBLICATIONS

Erlich, Alicia, "How to view, sort, share and save attachments in the Hub on OS 10.2.1", Published on: Mar. 5, 2014 Available at: http://crackberry.com/how-view-sort-share-and-save-attachments-hub-os-1021.

(Continued)

*Primary Examiner* — Andrea C Leggett
(74) *Attorney, Agent, or Firm* — Michael Best & Friedrich LLP

(57) ABSTRACT

Parsed attachments from email communications may be sorted. In some examples, an application, such as an email processing application, may display email summaries associated with emails within an email summary view of the email application interface. A selected email associated with a selected email summary may be displayed in an email view. The email processing application may identify one or more attachments within the emails. Attachment summaries associated with the one or more attachments may be displayed within an attachment summary view of the email application interface.

19 Claims, 8 Drawing Sheets

(51) Int. Cl.
  *G06F 17/27* (2006.01)
  *G06F 3/0482* (2013.01)
  *G06F 17/24* (2006.01)
  *G06F 17/22* (2006.01)
  *H04L 12/58* (2006.01)
  *G06Q 10/10* (2012.01)

(52) U.S. Cl.
  CPC ...... *G06F 3/04845* (2013.01); *G06F 17/2205* (2013.01); *G06F 17/24* (2013.01); *G06F 17/2705* (2013.01); *G06Q 10/107* (2013.01); *H04L 51/08* (2013.01)

(56) References Cited

U.S. PATENT DOCUMENTS

| | | | |
|---|---|---|---|
| 7,844,676 | B2 | 11/2010 | Prahlad et al. |
| 8,533,274 | B2 | 9/2013 | Buchheit et al. |
| 8,775,520 | B1 | 7/2014 | Lewis et al. |
| 8,826,148 | B2 | 9/2014 | Yuniardi et al. |
| 2006/0168543 | A1 | 7/2006 | Zaner-Godsey et al. |
| 2008/0037721 | A1 | 2/2008 | Yao et al. |
| 2008/0281927 | A1* | 11/2008 | Vanderwende ..... G06F 17/2745 709/206 |
| 2009/0037407 | A1 | 2/2009 | Yang et al. |
| 2009/0177754 | A1 | 7/2009 | Brezina et al. |
| 2009/0222402 | A1* | 9/2009 | Tysowski ................ H04W 4/12 |
| 2009/0319618 | A1 | 12/2009 | Affronti et al. |
| 2010/0070875 | A1* | 3/2010 | Turski .................. G06Q 10/107 715/748 |
| 2010/0082713 | A1 | 4/2010 | Frid-Nielsen et al. |
| 2012/0278402 | A1 | 11/2012 | Limont et al. |
| 2013/0297680 | A1 | 11/2013 | Smith et al. |
| 2014/0173457 | A1 | 6/2014 | Wang et al. |
| 2015/0134751 | A1 | 5/2015 | Meyers et al. |

OTHER PUBLICATIONS

"Popup sms", Retrieved on: Jul. 22, 2015 Available at: http://proideaclub.in/index.php/news/addictive-tips/9035-lightmail-is-an-elegant-iphone-mail-app-that-displays-all-attachments-in-one-place.

"OutlookAttachView v2.80—View/Extract/Save Outlook Attachments", Published on: Mar. 12, 2009 Available at: http://www.nirsoft.net/utils/outlook_attachment.html.

"Gmail Tip: Quickly find all attachments", Published on: Jan. 10, 2007 Available at: http://techlifeweb.com/gmail-tip-quickly-find-all-attachments/.

Burgess, Brian, "Using conversation view in outlook 2010", Published on: Aug. 2, 2010 Available at: http://www.howtogeek.com/howto/24180/using-conversation-view-in-outlook-2010/.

"International Search Report and Written Opinion Issued in PCT Application No. PCT/US2016/053646", dated Nov. 23, 2016, 12 Pages.

"Office Action Issued in European Patent Application No. 16781239.5", dated Mar. 25, 2019, 7 Pages.

* cited by examiner

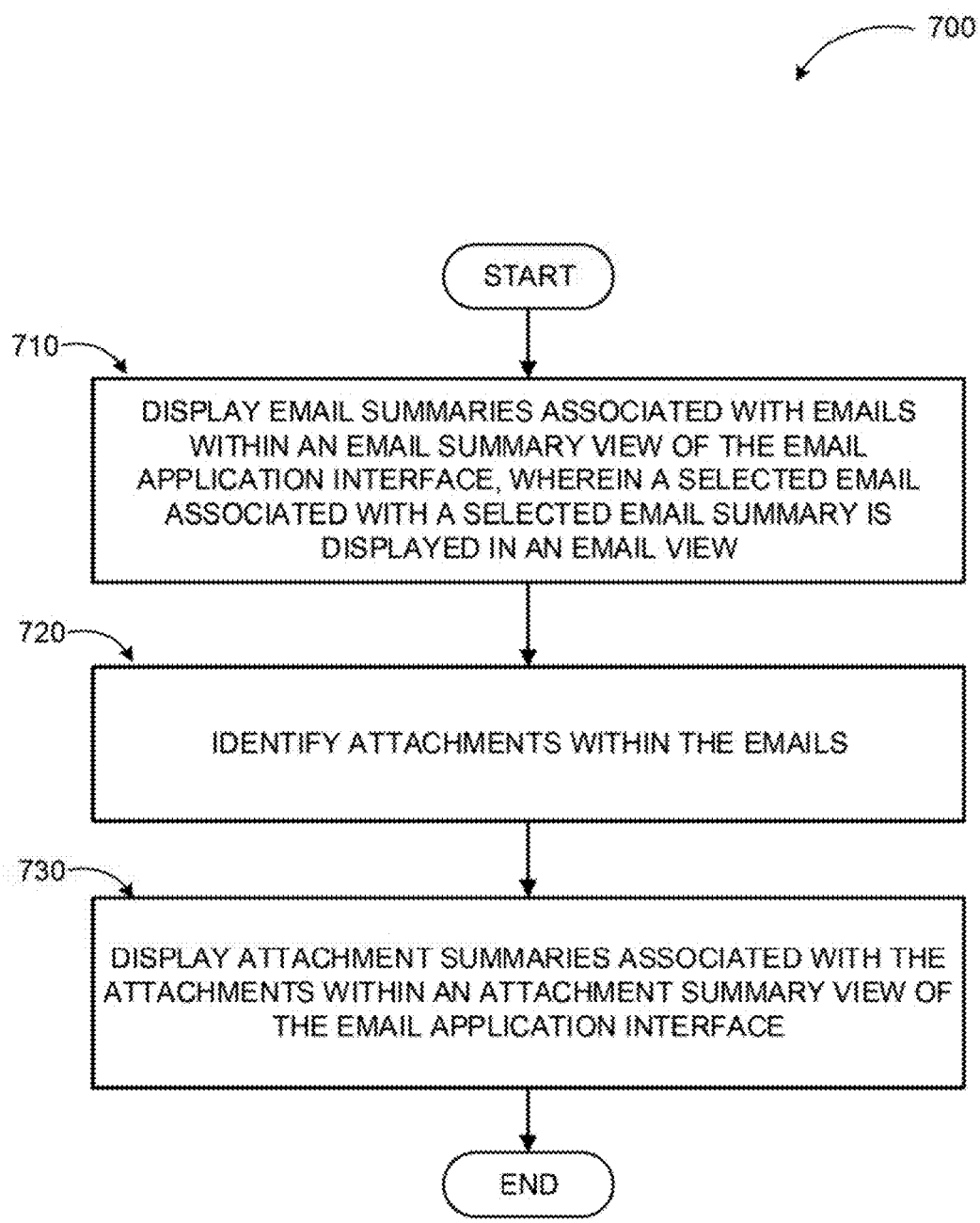

SORTING PARSED ATTACHMENTS FROM COMMUNICATIONS

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications such as a communication application. Attachment management in a communication application complicate user workflows.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to sorting parsed attachments from email communications. In some examples, an application, such as an email processing application, may display email summaries associated with emails within an email summary view of the email application interface. A selected email associated with a selected email summary may be displayed in an email view. The email processing application may identify one or more attachments within the emails. Attachment summaries associated with the one or more attachments may be displayed within an attachment summary view of the email application interface.

These and other features and advantages will be apparent from as reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 7 is a logic flow diagram illustrating a process for sorting parsed attachments from email communications, according to embodiments.

DETAILED DESCRIPTION

Figure 1:
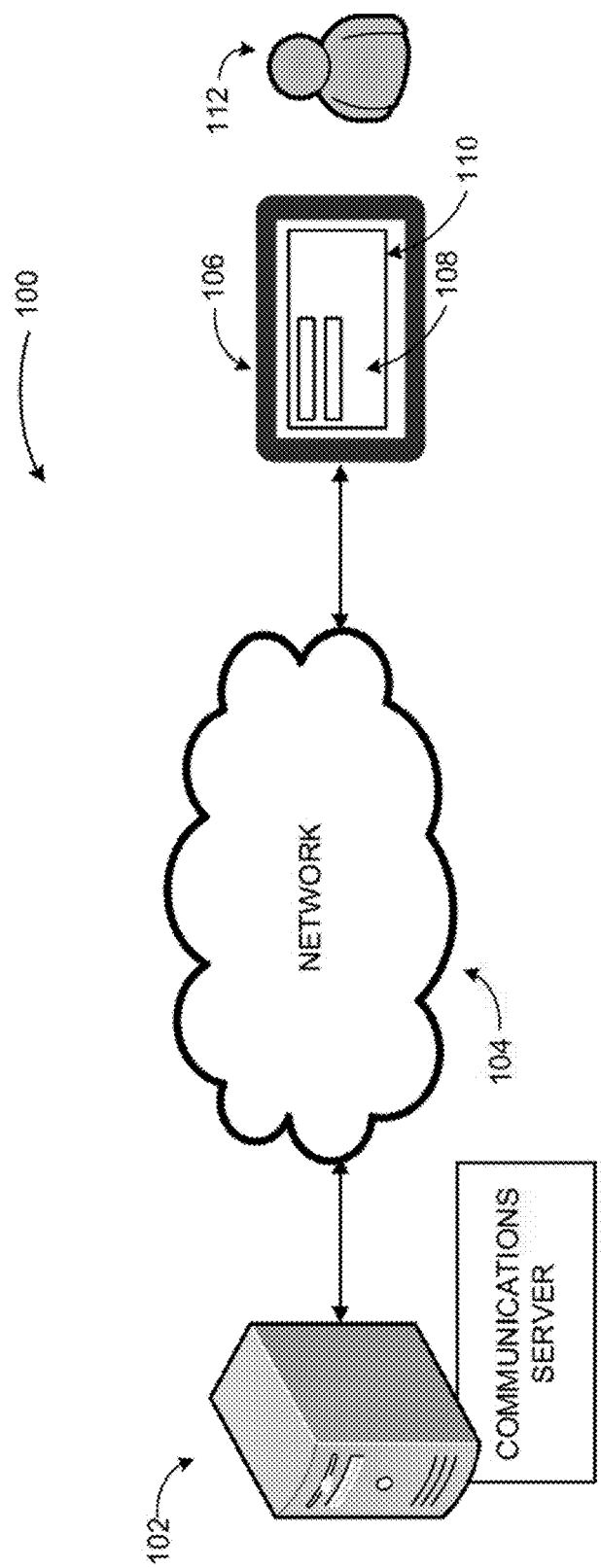
FIG. 1 is a conceptual diagram illustrating an example computing environment for sorting parsed attachments from email communications, according to embodiments.

As briefly described above, parsed attachments may be sorted from email communications. In some examples, an application, such as an email processing application, may display email summaries associated with emails within an email summary view of the email application interface. A selected email associated with a selected email summary may be displayed in an email view. The email processing application may identify one or more attachments within the emails. Attachment summaries associated with the one or more attachments may be displayed within an attachment summary view of the email application interface.

The email processing application may detect a selection of a sorting element on the attachment view to sort the attachment summaries. The attachment summaries may be sorted based on a file type of the one or more attachments, a metadata type associated with the one or more attachments, an author of associated emails, a recipient of the associated emails, a priority associated with the emails and assigned by the author of associated emails, and a timestamp of associated emails, among others. Additional actions may be performed on the attachment summaries, such as an edit action, a display action, and a move action, among others.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations including hand-held devices, multi-processor systems, microprocessor-based or programmable consumer electronics, minicomputers, mainframe computers, and comparable computing devices. Embodiments may also be practiced in distributed computing environments where tasks are performed h remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be as computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing communication services including emails and exchange of the one or more attachments. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable of non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using the emails herein, embodiments are not limited to the emails. Sorting parsed attachments from email communications may be implemented in other communication types such as instant messages, data sharing, application sharing, online conferencing, and similar communications, where files or objects may be exchanged as attachment with the communication.

The parsed attachments may include rich attachments. A rich attachment, as used herein, refers to any file or object that is included with a communication such as an email, where the file or object may be attached as a separate entity to the communication, inserted into a body of the communication as a file or object, or provided along with the communication as a link to the file or object. The attachment may include features such as interactivity, preview, presence, dynamic content update, and other non-static capabilities.

The technical advantages of sorting parsed attachments from email communications may include an increased efficiency in network usage (reduced communication traffic), a reduced data storage demand (reduction of copies of attachments), an improved user efficiency (availability of attachments with rich attachment attributes even from communication services without the capability), and an improved user interaction with user interfaces.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with attachments.

FIG. 1 is a conceptual diagram illustrating an example computing environment for sorting parsed attachments from email communications, according to embodiments.

As shown in a diagram 100, a computing device 106 may execute a communication processing application 110. The computing device 106 may include a display device, such as a touch enabled display component, and as monitor, among others, to provide the communication processing application 110 to a user 112. The computing device 106 may include a desktop computer, a laptop computer, a tablet, a smart phone, and a wearable computer, among other similar computing devices, for example.

In some examples, the communication processing application 110 may be executed on a communications server 102. The communications server 102 may include a web server or a document server, among others. The computing device 106 may communicate with the communications server 102 through a network 104. The network 104 may provide wired or wireless communications between nodes, such as the computing device 106 or the communications server 102. In other examples, the communication processing application 110 may be provided by a third party service, web applications, and/or a datacenter, among others.

The communication processing application 110 may display communication summaries of communications within a communication summary view presented by a communication application interface 108 of the computing device 106. The communication processing application 110 may detect a selection of one of the communication summaries and display the selected communication summary in the communication summary view. Next, the communication processing application 110 may detect a selection of an attachment element displayed in a proximity to the communication summary view. The attachment element may be an interactive user interface element. In some examples, the attachment element may be a button and a drop-down menu, among other configurations. In response, one or more attachments within the communications may be identified.

In some examples, the one or more attachments may be retrieved from a communications service hosted by the communications server 102. The one or more attachments may include content, such as structured data or streaming data. The streaming data may be associated with audio, video, graphics, images, and/or text, among others. The communication processing application 110 may display attachment summaries within an attachment summary view of the communication application interface 108.

While the example system in FIG. 1 has been described with specific components including the computing device 106, the communications server 102, and the communications processing application 110, embodiments are not limited to these components or system configurations and can be implemented with other system configuration employing fewer or additional components.

Figure 2:
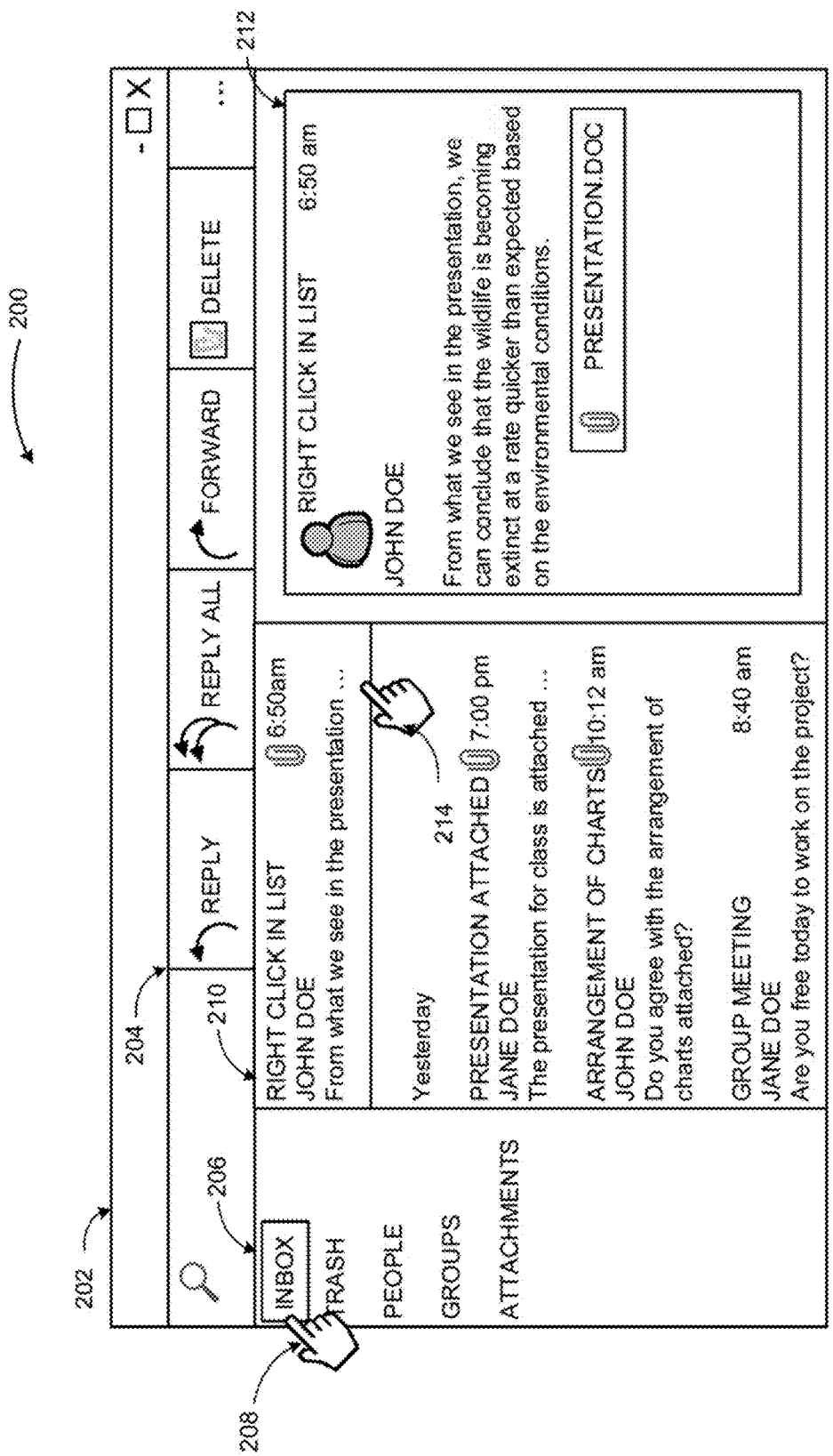
FIG. 2 is a display diagram illustrating an example email application interface of an email processing application that displays email summaries associated with emails within an email summary view of the email application interface, according to embodiments.

FIG. 2 is a display diagram illustrating an example email application interface of an email processing application that displays email summaries associated with emails within an email summary view of the email application interface, according to embodiments.

In a diagram 200, an email application interface 202 of an email processing application may display folders 206 associated with the email processing application. The email processing application may be an example of a communication application. The folder 206 may include an inbox folder, a trash folder, a people folder, and/or a groups folder, among others. The email processing application may detect a selection 208 of the inbox folder and display email summaries associated with emails received from other users in the email summary view 210 of the email application interface 202.

In response to a selection 214 of an email summary presented in the email summary view 210, the email processing application may display an email associated with the selected email summary in an email view 212. In some examples, the email processing application may display the email as a rich preview in the email view 212 of the email application interface 202. The email view 212 may also be displayed in proximity to the email summary view 210, for example. The displayed email may include one or more attachments in the body of the email.

The email processing application may be configured to provide control elements 204 through the email application interface 202. The email processing application may allow a user to interact with the control elements 204 to perform actions on the email associated with the selected email summary in the email summary view 210. The control elements 204 may include a reply element, a reply all element, a forward element, and/or a delete element, among others. For example, the email processing application may allow the user to select the forward element to forward the email associated with the selected email summary to a recipient(s).

Figure 3A:
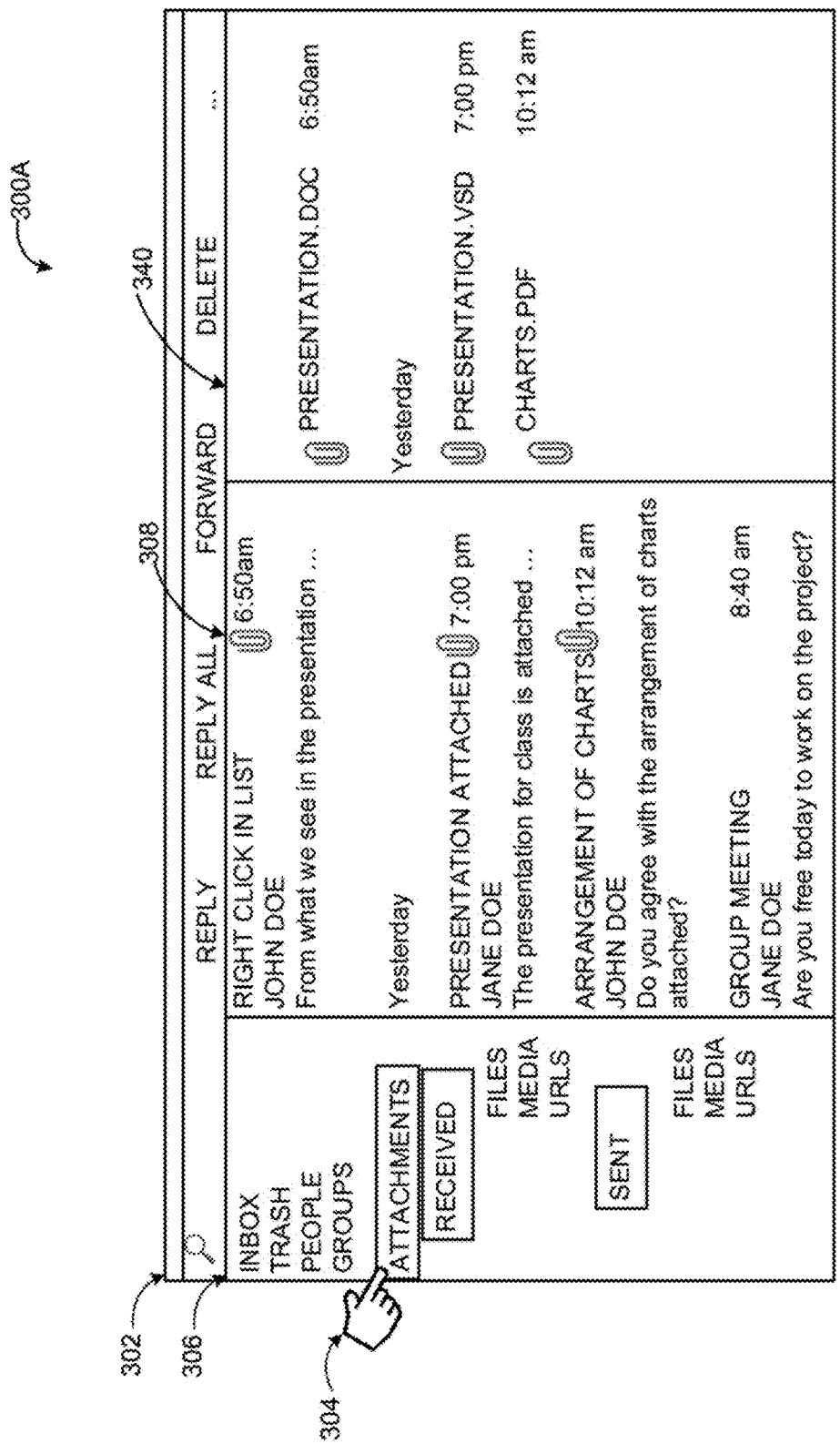
FIG. 3A is a display diagram illustrating an example email application interface of an email processing application that parses attachments from email communications, according to embodiments.

FIG. 3A is a display diagram illustrating an example email application interface of an email processing application that parses attachments from email communications, according to embodiments.

In a diagram 300A, an email application interface 302 of an email processing application may display folders 306 associated with the email processing application. The folders 306 may include emails. The folders 30 may include an inbox folder, a trash folder, a people folder, and a groups folder, among others. One or more attachment elements 304 may be displayed in a proximity to an email summary view 308. The email processing application may display email summaries associated with emails received from other users in the email summary view 308 of the email application interface 302. The email processing application may detect an activation of the one or more attachment elements 304. In response to the activation of the one or more attachment elements 304, the email processing application may display the emails in the email summary view 308 in a proximity to one or more attachments in an attachment summary view 340.

Figure 3B:
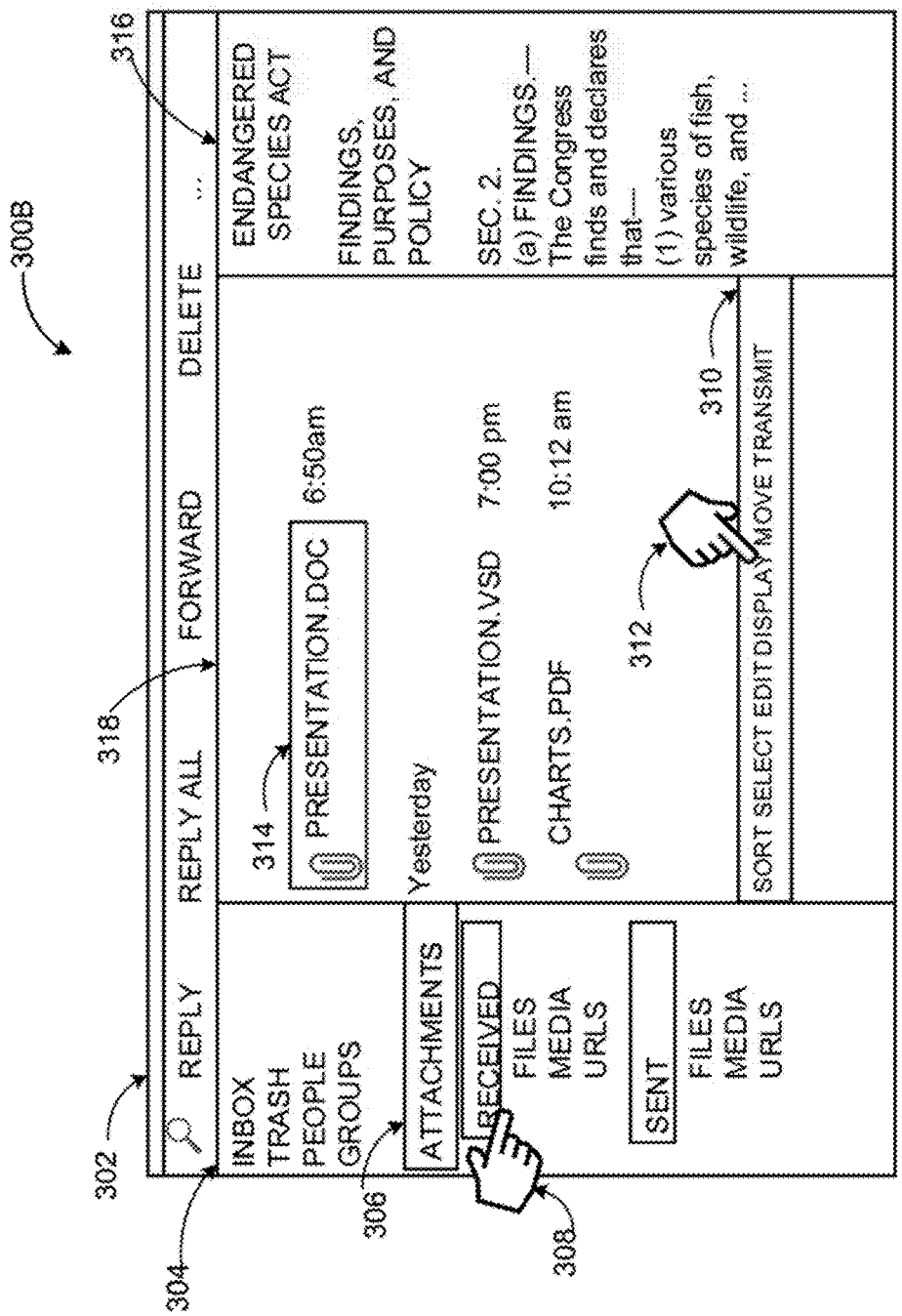
FIG. 3B is a display diagram illustrating an example email application interface of an email processing application that performs actions on the parsed attachments, according to embodiments.

FIG. 3B is a display diagram illustrating an example email application interface of an email processing application that performs actions on the parsed attachments, according to embodiments.

In a diagram 300B, an email application interface 302 of the email processing application may display folders 304 that contain emails. The email processing application may detect an activation 308 of one or more received attachments 306. For example, if the email processing application detects the activation of a received attachments folder 308, the email processing application may display attachment summaries of the received one or more attachments in an attachment summary view 318 of the email application interface 302.

The email processing application may detect an activation of one of the attachment summaries 314 of the one or more attachments on the attachment summary view 318. The email processing application may then detect an activation of elements 310 on the attachment summary view 318. The elements 310 may include a sort element, a select element, an edit element, a display element, a move element, and/or a transmit element, among others.

In response to detecting an activation of the display element 312 on the attachment summary view 318, for example, the attachment of the selected attachment summary may be displayed in an attachment view 316 of the email application interface 302. In some examples, the email processing application may display the attachment as a rich preview in the attachment view 316.

In response to detecting an activation of a sort element on the attachment summary view 318, for example, the one or more attachments may be sorted based on attachment-type properties, conversations associated with the one or more attachments, a location the one or more attachments were sent from, facial recognition associated with the one or more attachments, and patterns associated with the one or more attachments, among others. An example of the patterns associated with the one or more attachments may include, for example the one or more attachments of landscapes. The one or more attachments may be displayed in an attachment view 316 of the email application interface 302. In some examples, the email processing application may display the attachment as a rich preview in the attachment view 316. The attachments and the emails may be presented in a single user interface of the email processing application. Furthermore, image attachments may be processed for location, facial recognition, and other attributes, then sorted based on the processed attributes (e.g., pictures of family, pictures of landscapes, etc.).

For example, in response to detecting an activation of the edit element on the attachment summary view 318, the user may be provided with elements to modify the attachment associated with the selected attachment summary. In another example, in response to detecting an activation of a move element on the attachment summary view 318, the user may be allowed to move the attachment associated with the selected attachment summary to a storage location. The storage location may include an online storage service, another computing device of another user, a mass storage device, and/or a removable storage medium, among others.

In a further example, the email processing application may detect an activation of the attachment summaries of the one or more attachments on the attachment summary view 318. The email processing application may then detect an activation of the display element 312 on the attachment summary view 318 to present the one or more attachments associated with the selected attachment summaries. The one or more attachments may be displayed in a slideshow on the attachment view 316. The email processing application may also detect an activation of the move element on the attachment summary view 318 to move the one or more attachments to the storage location. The user may be allowed to move the one or more attachments.

Figure 4:
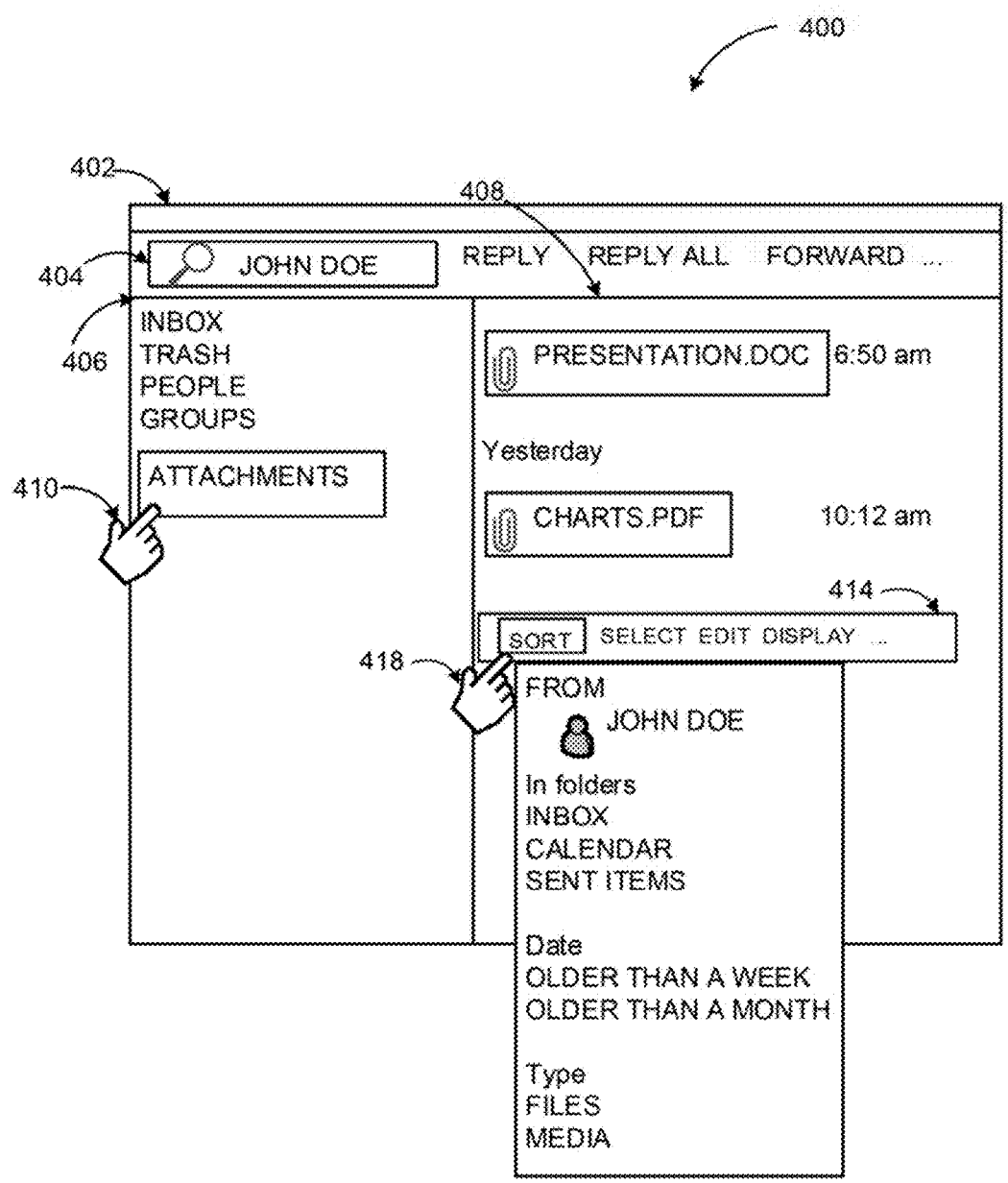
FIG. 4 is a display diagram illustrating an example email application interface of an email processing application that sorts parsed attachments from email communications, according to embodiments.

FIG. 4 is a display diagram illustrating an example email application interface of an email processing application that sorts parsed one or more attachments from email communications, according to embodiments.

In a diagram 400, an email application interface 402 of the email processing application may display folders 406 that contain emails (i.e.: inbox, sent). In response to an activation 410 of an attachment element, the email processing application may identify one or more attachments within emails. Attachment summaries may be displayed in the attachment summary view 408.

The email processing application may be configured to provide control elements 404 through the email application interface 402. For example, the email processing application may detect a user action on one the control elements 404 to search the one or more attachments. The one or more attachments may be searched based on a file type of the one or more attachments, in response to the user action, the email processing application may identify the one or more attachments matching the user action (i.e. the file type of the one or more attachments). The email processing application may display the attachment summaries of the one or more attachments that match the search parameters, in the attachment summary view 408.

In another example, the email processing application may allow a user to search the one or more attachments based on a metadata type associated with the one or more attachments, a priority associated with the emails and assigned by the author of associated emails, and/or a timestamp of associated emails, among others. For example, the email processing application may detect a user input of a search parameter such as the metadata type associated with the one or more attachments into one of the control elements 404. The attachment summaries of the one or more attachments, that match the search parameter, may be displayed in the attachment summary view 408.

In a further example, the email processing application may detect the user input of a search parameter such as an author's name associated with the one or more attachments (i.e. "John Doe") into one of the control elements 404. The email processing application may display the attachment summaries of the one or more attachments that match the search parameter, in the attachment summary view 408.

In response to the activation 418 of control elements 414 on the attachment summary view 408, the email processing application may display a menu (not shown). The menu may be a drop-down menu and/or a pane, among others. The menu may provide additional controls with additional features to allow the user to control an operation applied to an attachment with additional granularity. For example, a sort operation applied to selected attachment summaries may be filtered to include additional sort parameters applied to the selected attachment through the controls provided by the menu.

The control elements 414 may include a sort element, a select, element, an edit element, a display element, a move element, and/or a transmit element, among others. For example, the email processing application may detect an activation 418 of the sort element. In response the attachment summaries from the emails received from the author "John Doe" may be sorted based on a file type of the one or more attachments, a location of where the attachment was sent from, a metadata type associated with the one or more attachments, an author of associated emails, a recipient of associated emails, a priority associated with the emails and assumed by the author of associated emails, and/or a timestamp of associated emails, among others.

If the attachment summaries include graphics or videos, the email processing application may allow the user to select the sort element to further sort the attachment summaries based on a location where the graphics or the videos were taken and/or a timestamp associated with the graphics or the videos. In another example, the email processing application may allow the user to select the sort element to further sort the attachment summaries based on identification tags associated with facial recognition in the graphics or the videos. For example, the email processing application may utilize facial recognition to identify and sort the graphics or the videos of a person (i.e.: "Jane Doe").

The example scenarios and schemas in FIG. 1 through FIG. 4 are shown with specific components, data types, and configurations. Embodiments are not limited to systems according to these example configurations. Sorting parsed attachments from email communications may be implemented in configurations employing fewer or additional components in applications and user interfaces. Furthermore, the example schema and components shown in FIG. 1 through FIG. 4 and their subcomponents may be implemented in a similar manner with other values using the principles described herein.

Figure 5:
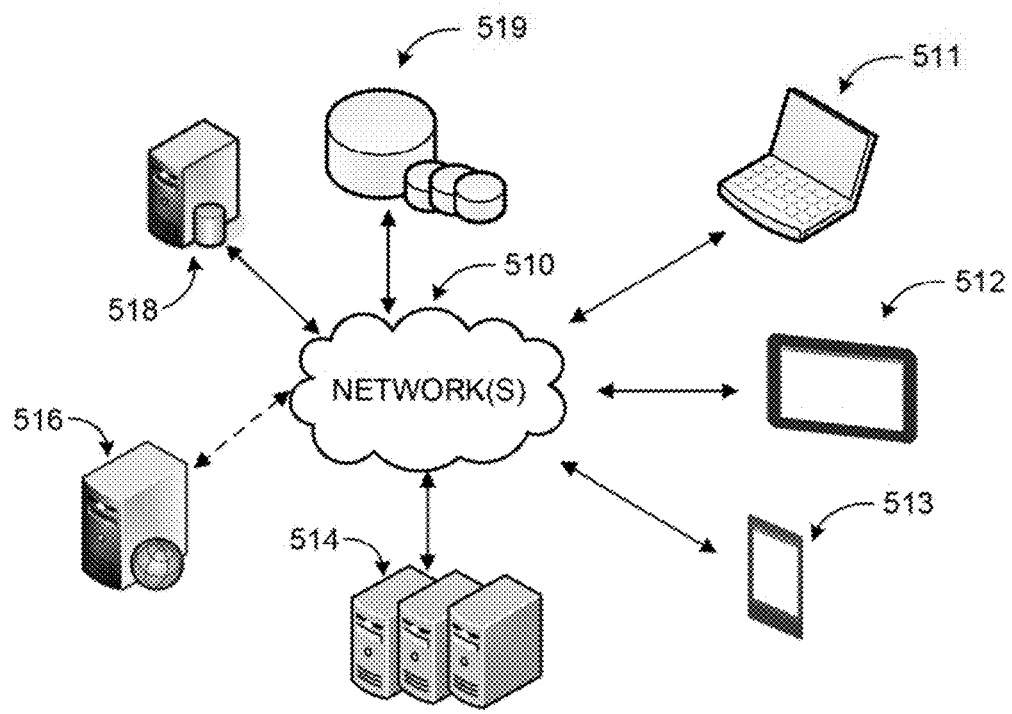
FIG. 5 is a simplified networked environment, where a system according to embodiments may be implemented.

FIG. 5 is an example networked environment, where a system according to embodiments may be implemented.

An email processing application may be configured to sort parsed attachments from email communications. The email processing application may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. An application, such as the email processing application, may display email summaries associated with emails within an email summary view of an email application interface. A selected email may be displayed in an email view in response to an activation of one of the email summaries. In response to detecting an activation of an attachment element (displayed in a proximity to the email summary view), one or more attachments within the emails may be identified. Next, attachment summaries of the one or more attachments may be displayed within an attachment summary view of the email application interface. The email processing application may store data associated with the one or more attachments in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to sort parsed attachments from email communications. Furthermore, the networked environments discussed in FIG. 5 are for illustration purposes only. Embodiments are not limited to the example applications, modules, or processes.

Figure 6:
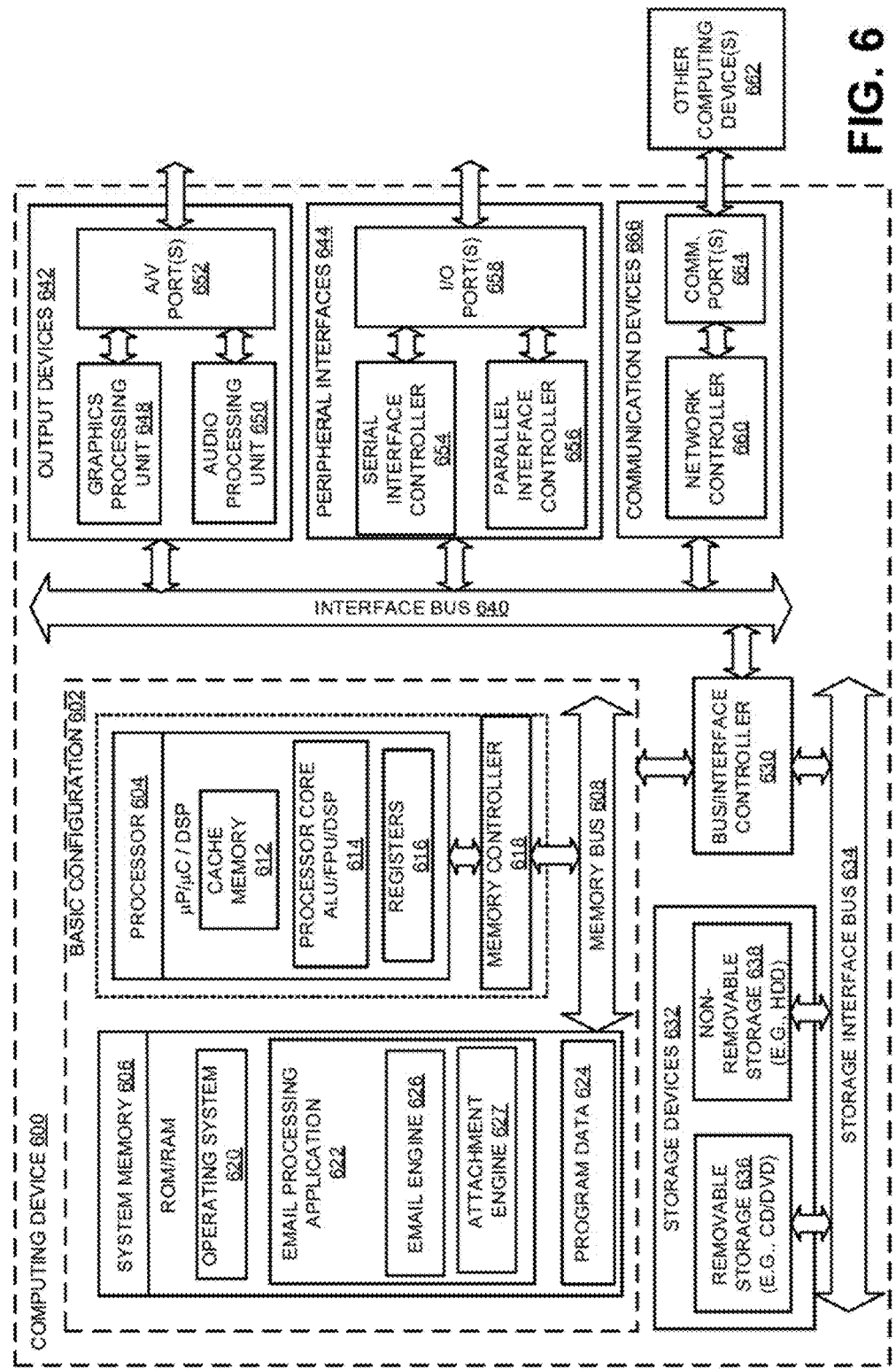
FIG. 6 is a block diagram of an example computing device, which may be used to sort parsed attachments from email communications, according to embodiments.

FIG. 6 is a block diagram of an example computing device, which may be used to sort parsed attachments from email communications, according to embodiments.

For example, a computing device 600 may be used as a server, desktop computer, portable computer, a smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, an email processing application 622, and a program data 624. The email processing application 622 may include an email engine 626 and an attachment engine 627. The email engine 626 may be configured to display email summaries associated with emails within an email summary view of an email application interface. A selected email may be displayed in an email view in response to an activation of one of the email summaries. The email engine 626 may also detect an activation of an attachment element displayed in a proximity to the email summary view. The attachment engine 627 may identify one or more attachments within the emails. The attachment engine 627 may display attachment summaries of the one or more attachments within an attachment summary view of the email application interface.

Components of the email processing application 622 (such as an email processing interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the email processing application 622, displayed by the touch based device. The program data 624 may also include, among other data, change data 628, or the like, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the example basic configuration 602 via the bus interlace controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, primer, scanner, etc.) via one or more I/O ports 658. An example communication device 666 includes a network controller 660, which may be arranged to facilitate communications with one or more other computing devices 662 over a network communication link via one or more communication ports 604. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to sort parsed attachments from email communications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

FIG. 7 is a logic flow diagram illustrating a process for sorting parsed attachments from email communications, according to embodiments.

A process 700 may be implemented on a computing device, such as the computing device 600, or with another system. As described, a user may be allowed to interact with an email processing application through an input device or a touch enabled display component of the computing device 600. The computing device 600 may include a display device to provide an email application interface of the email processing application to the user.

The process 700 begins with operation 710, where the email processing application may display email summaries associated with emails within an email summary view of the email application interface. A selected email associated with a selected email summary may be displayed in an email view in response to an activation of one of the email summaries. For example, the email processing application may detect an activation of an edit element on the email view to perform a modification to the emails.

At operation 720, the email processing application identify one or more attachments within the emails. At operation 730, the email processing application may display attachment summaries of the one or more attachments within an attachment summary view of the email application interface. In some examples, the email processing application may detect an activation of elements on the attachment view to perform a modification to the one or more attachments, a sorting of the one or more attachments, and a transmission of the one or more attachments to another storage location. For example, the email processing application may detect an activation of a sorting element on the attachment view to sort the attachment summaries based on, a file type of the one or more attachments, a metadata type associated with the one or more attachments, an author of associated emails, a recipient of associated emails, a priority associated with the emails and assigned by the author of associated emails, and a timestamp of associated emails, among others.

The operations included in process 700 are for illustration purposes. Sorting parsed attachments from email communications may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means for sorting parsed attachments from communications may include a means for displaying communications summaries associated with communications within a communication summary view of a communication application interface, a means for detecting an activation of an attachment element displayed in a proximity to the communication summary view, a means for identifying one or more attachments within the communications, and a means for displaying attachment summaries associated with the one or more attachments within an attachment summary view of the communication application interface.

According to some examples, computing devices to sort parsed attachments from email communications are described. An example computing device may include a display, a memory configured to store instructions associated with an email processing application, and one or more processors coupled to the memory and the display. The one or more processors may execute an email application interface of the email processing application in conjunction with the instructions stored in the memory. The email processing application may include an email engine and an attachment engine. The email engine may be configured to display email summaries associated with emails within an email summary view of the email application interface. A selected email associated with a selected email summary may be displayed in an email view. The attachment engine may be configured to identify the one or more attachments within the emails and display attachment summaries associated with the one or more attachments within an attachment summary view of the email application interface.

In other examples, the attachment engine may be further configured to detect an activation of a sorting element on the attachment summary view to sort the attachment summaries based on a file type of the one or more attachments and/or a metadata type associated with the one or more attachments. In another example, the attachment engine may be further configured to detect an activation of a sorting element on the attachment summary view to sort the attachment summaries based on an author of associated emails, a recipient of associated emails, a priority associated with the emails and assigned by the author of associated emails, and/or a timestamp of associated emails.

In further examples, the attachment engine may be further configured to detect an activation of one of the attachment summaries on the attachment summary view. The attachment engine may be further configured to present the one or more attachments associated with the selected attachment summary in the attachment summary view along with one or more edit elements to allow editing of one or more of the one or more attachments, in response to detecting a modify action to modify the one or more attachments associated with the selected attachment summary. In another example, the attachment engine may be further configured to detect an activation of a sorting element, on the attachment summary view to sort the attachment summaries based on an author of the emails associated with the attachment summaries. The attachment engine may be further configured to detect an activation of two or more of the attachment summaries on the attachment summary view based on the author of the associated emails. The attachment engine may be further configured to present the one or more attachments associated with the selected attachment summaries in a slideshow on an attachment view in response to detecting a display action to display the one or more attachments associated with the selected attachment summaries.

In another example, the attachment engine may be further configured to detect an activation of one of the attachment summaries on the attachment summary view. The attachment engine may be further configured to move the one or more attachments associated with the selected attachment summary to a storage location associated with a move action, in response to detecting the move action to move the one or more attachments associated with the selected attachment summary. The storage location includes an online storage service, another computing device, a mass storage device, or a removable storage medium.

In some examples, the attachment engine may be further configured to detect an activation of two or more of the attachment summaries on the attachment summary view. In some examples, the attachment engine may be further configured to present the one or more attachments associated with the selected attachment summaries in an attachment view, in response to detecting a display action to display the one or more attachments associated with the selected attachment summaries. The one or more attachments associated with the selected attachment summaries may be displayed in as slideshow in the attachment view. In some examples, the attachment engine may be further configured to move the one or more attachments associated with the selected attachment summaries to as storage location associated with a move action, in response to detecting the move action to move the one or more attachments.

According to some embodiments, methods executed on one or more computing devices to sort parsed attachments from communications are provided. An example method may include displaying communications summaries associated with communications within as communication summary view of a communication application interface, detecting an activation of an attachment element displayed in a proximity to the communication summary view, a identifying the one or more attachments within the communications, and displaying attachment summaries associated with the one or more attachments within an attachment summary view of the communication application interface.

In other examples, a selected communication may be displayed as a rich preview on the communication view of the communication application interface. A selected attachment from the one or more attachments may be displayed as a rich preview on an attachment view of the communication application interface. In further examples, an activation of one of the attachment summaries displayed on the attachment summary view may be detected, a selected attachment associated with the selected attachment summary in the attachment view may be presented, and the selected attachment associated with the selected attachment summary may be moved to a storage location associated with a move action, in response to detecting the move action to move the selected attachment.

In further examples, an activation of one of the communication summaries displayed on the communication summary view may be detected and a selected communication associated with the selected communications summary may be presented in the communications view. The communications may be part of one or more of an email exchange, an instant message exchange, a data sharing session, an application sharing session, and/or an online conference.

According to some examples, computer-readable memory devices with instructions stored thereon to sort parsed attachments from communications are described. An example instruction may include displaying communications summaries associated with communications within a communication summary view of a communication application interface. A selected communication associated with a selected communication summary may be displayed in a communication view. Example instructions may further include detecting an activation of an attachment element displayed in a proximity to the communication summary view, identifying the one or more attachments within the communications, and displaying attachment summaries associated with the one or more attachments within an attachment summary view of the communication application interface.

In some examples, the instructions may further include detecting an activation of one of the attachment summaries displayed on the attachment summary view, presenting a selected attachment associated with the selected attachment summary in the attachment view, and moving the selected attachment associated with the selected attachment summary to a storage location associated with a move action in response to detecting the move action to move the selected attachment. In additional examples, the instructions may further include detecting an activation of one of the communication summaries displayed on the communication summary view and presenting a selected communication associated with the selected communication summary in the communications view.

In other examples, the instructions may further include detecting an activation of two or more of the attachment summaries on the attachment summary view. In response to detecting a display action to display the one or more attachments associated with the selected attachment summaries, the instructions may further include presenting the one or more attachments associated with the selected attachment summaries in the attachment view. The one or more attachments associated with the selected attachment summaries may be displayed in a slideshow on the attachment view. The instructions may further include moving the one or more attachments associated with the selected attachment summaries to a storage location associated with a move action, in response to detecting the move action to move the one or more attachments.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for sorting parsed attachments from email communications, the computing device comprising:
 a memory configured to store instructions associated with an email processing application;
 one or more processors coupled to the memory, the one or more processors executing an email application interface of the email processing application in conjunction with the instructions stored in the memory, wherein the one or more processors are configured to
    display email summaries associated with emails within an email summary view of the email application interface, wherein at least two of the emails includes an attachment and wherein an indication of an included attachment is displayed in each email summary associated with an email that includes an attachment, and wherein the email summaries are chronologically grouped;
    detect an activation of an attachment element displayed in proximity to the email summary view;
    identify a plurality of attachments included within the emails;
    display an attachment summary associated with each of the identified plurality of attachments within an attachment summary view of the email application interface separate from the email summary view, wherein the attachment summaries are displayed within the attachment summary view according to a same chronological grouping as the email summaries as displayed within the email summary view and wherein each attachment summary includes information regarding the associated attachment; and
    detect an activation of a sorting element on the attachment summary view and, in response to the activation of the sorting element, update the attachment summaries displayed within the attachment summary view of the email application interface to sort the attachment summaries based on one or more of: an author of associated emails, a recipient of associated emails, a priority associated with the emails and assigned by the author of associated emails, and a timestamp of associated emails.

2. The computing device of claim 1, wherein the one or more processors are further configured to:
    detect an activation of a sorting element on the attachment summary view to sort the attachment summaries based on one or more of: a file type of the attachments and a metadata type associated with the attachments.

3. The computing device of claim 1, wherein the one or more processors are further configured to:
    detect an activation of one of the attachment summaries on the attachment summary view; and
    in response to detecting a modify action to modify one or more of the attachments associated with the selected attachment summary, present the attachments associated with the selected attachment summary in the attachment summary view along with one or more edit elements to allow editing of one or more of the attachments.

4. The computing device of claim 1, wherein the one or more processors are further configured to:
    detect an activation of a sorting element on the attachment summary view to sort the attachment summaries based on an author of the emails associated with the attachment summaries;
    detect an activation of two or more of the attachment summaries on the attachment summary view based on the author of the associated emails; and
    in response to detecting a display action to display the attachments associated with the selected attachment summaries, present the attachments associated with the selected attachment summaries in a slideshow on an attachment view.

5. The computing device of claim 1, wherein the one or more processors are further configured to:
    detect an activation of one of the attachment summaries on the attachment summary view; and
    in response to detecting a move action to move one or more attachments associated with the selected attachment summary, move the one or more attachments associated with the selected attachment summary to a storage location associated with a move action.

6. The computing device of claim 5, wherein the storage location includes one of an online storage service, another computing device, a mass storage device, and a removable storage medium.

7. The computing device of claim 1, wherein the one or more processors are further configured to:
    detect an activation of two or more of the attachment summaries on the attachment summary view; and
    in response to detecting a display action to display the attachments associated with the selected attachment summaries, present the attachments associated with the selected attachment summaries in an attachment view.

8. The computing device of claim 7, wherein the attachments associated with the selected attachment summaries are displayed in a slideshow in the attachment view.

9. The computing device of claim 7, wherein the one or more processors are further configured to:
    in response to detecting a move action to move the attachments, move the attachments associated with the selected attachment summaries to a storage location associated with a move action.

10. A method for sorting parsed attachments from communications, the method comprising:
    displaying communications summaries associated with the communications within a communication summary view of a communication application interface, wherein at least two of the communications includes an attachment and wherein an indication of an included attachment is displayed in each communication summary associated with a communication that includes an attachment, and wherein the communication summaries are chronologically grouped;
    detecting an activation of an attachment element displayed in a proximity to the communication summary view;
    identifying a plurality of attachments included within the communications; and
    displaying an attachment summary associated with each of the identified plurality of attachments within an attachment summary view of the communication application interface separate from the communication summary view, wherein the attachment summaries are displayed within the attachment summary view of the communication application according to a same chronological grouping as the communication summaries as displayed within the communication summary view and wherein each attachment summary includes information regarding the associated attachment; and
    detecting an activation of a sorting element on the attachment summary view and, in response to the activation of the sorting element, updating the attachment summaries displayed within the attachment summary view of the communication application interface to sort the attachment summaries based on one or more of: an author of associated communications, a recipient of associated communications, a priority associated with the communications and assigned by the author of associated communications, and a timestamp of associated communications.

11. The method of claim 10, further comprising:
displaying a selected communication as a rich preview on the communication view of the communication application interface.

12. The method of claim 10, further comprising:
displaying a selected attachment from the attachments as a rich preview on an attachment view of the communication application interface.

13. The method of claim 10, further comprising:
detecting an activation of one of the attachment summaries displayed on the attachment summary view;
presenting a selected attachment associated with the selected attachment summary in the attachment view; and
in response to detecting a move action to move the selected attachment, moving the selected attachment associated with the selected attachment summary to a storage location associated with the move action.

14. The method of claim 10, further comprising:
detecting an activation of one of the communication summaries displayed on the communication summary view; and
presenting a selected communication associated with the selected communications summary in the communications view.

15. The method of claim 10, wherein the communications are part of one or more of an email exchange, an instant message exchange, a data sharing session, an application sharing session, and/or an online conference.

16. A computer-readable hardware memory device with instructions stored thereon for sorting parsed attachments from communications, the instructions comprising:
displaying communications summaries associated with the communications within a communication summary view of a communication application interface, wherein at least two of the communications includes an attachment and wherein an indication of an included attachment is displayed in each communication summary associated with a communication that includes an attachment and wherein the communication summaries are chronologically grouped;
detecting an activation of an attachment element displayed in a proximity to the communication summary view;
identifying a plurality of attachments included within the communications;
displaying an attachment summary associated each of with the identified plurality of attachments within an attachment summary view of the communication application interface separate from the communication summary view, wherein the attachment summaries are displayed within the attachment summary view according to a same chronological grouping as the communication summaries as displayed within the communication summary view and wherein each attachment summary includes information regarding the associated attachment;
detecting an activation of a sorting element on the attachment summary view and, in response to the activation of the sorting element, updating the attachment summaries displayed within the attachment summary view of the communication application interface to sort the attachment summaries based on one or more of: an author of associated communications, a recipient of associated communications, a priority associated with the communications and assigned by the author of associated communications, and a timestamp of associated communications.

17. The computer-readable hardware memory device of claim 16, wherein the instructions further comprise:
detecting an activation of one of the attachment summaries displayed on the attachment summary view;
presenting a selected attachment associated with the selected attachment summary in the attachment view; and
in response to detecting a move action to move the selected attachment, moving the selected attachment associated with the selected attachment summary to a storage location associated with the move action.

18. The computer-readable hardware memory device of claim 16, wherein the instructions further comprise:
detecting an activation of one of the communication summaries displayed on the communication summary view; and
presenting a selected communication associated with the selected communication summary in the communications view.

19. The computer-readable hardware memory device of claim 16, wherein the instructions further comprise:
detecting an activation of two or more of the attachment summaries on the attachment summary view;
in response to detecting a display action to display the attachments associated with the selected attachment summaries, presenting the attachments associated with the selected attachment summaries in the attachment view, wherein the attachments associated with the selected attachment summaries are displayed in a slideshow on the attachment view; and
in response to detecting a move action to move the attachments, moving the attachments associated with the selected attachment summaries to a storage location associated with the move action.

* * * * *